(12) United States Patent
He

(10) Patent No.: US 12,167,357 B2
(45) Date of Patent: Dec. 10, 2024

(54) METHOD AND DEVICE FOR TRANSMITTING SSB IN AN UNLICENSED SPECTRUM

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 508 days.

(21) Appl. No.: 17/245,400

(22) Filed: Apr. 30, 2021

(65) Prior Publication Data

US 2021/0250883 A1 Aug. 12, 2021

Related U.S. Application Data

(63) Continuation of application No. PCT/CN2018/113791, filed on Nov. 2, 2018.

(51) Int. Cl.
*H04W 56/00* (2009.01)
*H04L 5/00* (2006.01)
*H04W 8/00* (2009.01)

(52) U.S. Cl.
CPC ........ *H04W 56/006* (2013.01); *H04L 5/0048* (2013.01); *H04W 8/005* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 2017/0331577 | A1 | 11/2017 | Parkvall et al. |
| 2017/0331670 | A1 | 11/2017 | Parkvall et al. |
| 2019/0037481 | A1* | 1/2019 | Zhang .................. H04L 5/0032 |
| 2019/0104552 | A1* | 4/2019 | Hui ........................ H04W 48/10 |
| 2019/0110242 | A1* | 4/2019 | Islam .................. H04J 11/0069 |

(Continued)

FOREIGN PATENT DOCUMENTS

| | | |
|---|---|---|
| CN | 106385711 A | 2/2017 |
| CN | 106656895 A | 5/2017 |

(Continued)

OTHER PUBLICATIONS

First Office Action of the Chinese application No. 202111004640.6, issued on Nov. 29, 2022. 12 pages with English translation.

(Continued)

*Primary Examiner* — Andrew C Oh
(74) *Attorney, Agent, or Firm* — Perkins Coie LLP

(57) ABSTRACT

A method for transmitting a synchronization signal block (SSB) on an unlicensed spectrum includes: a network device determines that a first transmission opportunity (TXOP) on an unlicensed carrier includes K SSB positions capable of being used to transmit SSBs, where K is less than a number X of SSBs configured by the network device for transmission on the unlicensed carrier, and K and X are both positive integers; and the network device respectively transmits K SSBs of the X SSBs at the corresponding K SSB positions within the first TXOP.

6 Claims, 12 Drawing Sheets

(56) References Cited

U.S. PATENT DOCUMENTS

| | | | | |
|---|---|---|---|---|
| 2019/0159226 | A1* | 5/2019 | Ly | H04W 72/23 |
| 2020/0137806 | A1* | 4/2020 | Islam | H04B 7/0408 |
| 2021/0036765 | A1* | 2/2021 | Keskitalo | H04W 72/0446 |
| 2021/0307061 | A1* | 9/2021 | Huang | H04W 74/0808 |
| 2022/0104152 | A1* | 3/2022 | Wu | H04L 5/0046 |

FOREIGN PATENT DOCUMENTS

| | | | | |
|---|---|---|---|---|
| CN | 108496321 A | | 9/2018 | |
| CN | 108631971 A | | 10/2018 | |
| WO | WO-2020056589 A1 | * | 3/2020 | H04L 27/2602 |
| WO | WO-2020061936 A1 | * | 4/2020 | H04L 5/0048 |
| WO | WO-2020061946 A1 | * | 4/2020 | H04L 27/26025 |

OTHER PUBLICATIONS

Office Action of the Indian application No. 202117023558, issued on Mar. 1, 2022. 4 pages with English Translation.

Second Office Action of the Chinese application No. 202111004640.6, issued on Feb. 28, 2023. 8 pages with English translation.

Qualcomm Incorporated. "DL Signals and Channels for NR-U" 3GPP TSG RAN WG1 Meeting #94bis R1-1811250, Oct. 12, 2018 (Oct. 12, 2018), 1-5.

International Search Report in the international application No. PCT/CN2018/113791, mailed on Jul. 31, 2019.

Written Opinion of the International Search Authority in the international application No. PCT/CN2018/113791, mailed on Jul. 31, 2019. 6 pages with English translation.

Qualcomm Incorporated, "DL signals and channels for NR-U", 3GPP TSG RAN WG1 Meeting #94 R1-1809477, Gothenburg, Sweden Aug. 20-Aug. 24, 2018. 9 pages.

OPPO, "Initial access and mobility for NR-U", 3GPP TSG RAN WG1 Meeting #94bis R1-1810959, Chengdu, China, Oct. 8-12, 2018. 4 pages.

Supplementary European Search Report in the European application No. 18938728.5, mailed on Nov. 11, 2021. 8 pages.

* cited by examiner

300

A network device determines that a TXOP on an unlicensed carrier includes K SSB positions capable of being used to transmit SSBs, where K is less than a number X of SSBs configured by the network device for transmission on the unlicensed carrier, and K and X are both positive integers — 310

The network device transmits K SSBs of the X SSBs at the K corresponding SSB positions within the first TXOP — 320

The network device transmits remaining X-K SSBs of the X SSBs within a second TXOP after the first TXOP — 330

A network device determines that a first TXOP on an unlicensed carrier includes K SSB positions capable of being used to transmit SSBs, where K is less than a number X of SSBs configured by the network device for transmission on the unlicensed carrier, and K and X are both positive integers — 710

The network device determines that the K SSB positions capable of being used to transmit SSBs within the first TXOP are not used to transmit SSBs — 720

The network device transmits the X SSBs within a second TXOP after the first TXOP, each of the X SSBs is transmitted at a candidate SSB position corresponding to the SSB, and different SSBs correspond to different candidate SSB positions — 730

FIG. 7

METHOD AND DEVICE FOR TRANSMITTING SSB IN AN UNLICENSED SPECTRUM

CROSS-REFERENCE TO RELATED APPLICATIONS

The application is a continuation application of PCT Application No. PCT/CN2018/113791 filed on Nov. 2, 2018, the disclosure of which is hereby incorporated by reference in its entity.

BACKGROUND

In a 5G system or a New Radio (NR) system, data transmission on an unlicensed spectrum is supported. When a communication device communicates on an unlicensed spectrum, it is necessary to base on the principle of Listen Before Talk (LBT). That is, channel detection needs to be performed before signal transmission is performed on a channel on the unlicensed spectrum, and signal transmission can be performed only when a result of the channel detection is that the channel is idle; and if the result of the channel detection performed on the unlicensed spectrum is that the channel is busy, the signal transmission cannot be performed.

Considering the uncertainty of obtaining the right of use of the channel on the unlicensed spectrum, how to transmit the SSBs on the unlicensed spectrum becomes an urgent problem to be solved.

SUMMARY

Embodiments of the present disclosure relate to the field of communications, and more particularly to a method and device for transmitting a Synchronizing Signal/PBCH Block (SSB or SS/PBCH Block) on an unlicensed spectrum.

A method and device for transmitting an SSB on an unlicensed spectrum are provided according to the embodiments of the present disclosure, so that efficient transmission of the SSB on the unlicensed spectrum can be implemented.

According to a first aspect of the disclosure, there is provided a method for transmitting an SSB on an unlicensed spectrum, including: a network device determines that a first transmission opportunity (TXOP) on an unlicensed carrier includes K SSB positions capable of being used to transmit SSBs, where K is less than a number X of SSBs configured by the network device for transmission on the unlicensed carrier, and K and X are both positive integers; and the network device respectively transmits K SSBs of the X SSBs at the corresponding K SSB positions within the first TXOP.

According to a second aspect of the disclosure, there is provided a method for transmitting an SSB on an unlicensed spectrum, including: a network device determines that a first TXOP on an unlicensed carrier includes K SSB positions capable of being used to transmit SSBs, where K is less than a number X of SSBs configured by the network device for transmission on the unlicensed carrier, and K and X are both positive integers; and the network device determines that the K SSB positions capable of being used to transmit SSBs within the first TXOP are not used to transmit SSBs.

According to a third aspect of the disclosure, there is provided a network device, including: a memory storing processor-executable instructions; a processor configured to execute the stored processor-executable instructions to determine that a first transmission opportunity (TXOP) on an unlicensed carrier includes K SSB positions capable of being used to transmit SSBs, where K is less than a number X of SSBs configured by the network device for transmission on the unlicensed carrier, and K and X are both positive integers; and a transceiver configured to transmit K SSBs of the X SSBs at the corresponding K SSB positions within the first TXOP.

BRIEF DESCRIPTION OF THE DRAWINGS

FIG. 3 is a schematic flow chart of a method for transmitting an SSB on an unlicensed spectrum according to an embodiment of the present disclosure.

FIG. 7 is a schematic flow chart of a method for transmitting an SSB on an unlicensed spectrum according to another embodiment of the present disclosure.

DETAILED DESCRIPTION

The technical solution in the embodiments of the present disclosure will be described below in conjunction with the drawings in the embodiments of the disclosure. It is apparent that the described embodiments are a part of the embodiments of the disclosure, not all of the embodiments. Based on the embodiments in the present disclosure, all other embodiments obtained by those skilled in the art without creative effort belong to the protection scope of the disclosure.

The technical solutions of the embodiments of the present disclosure may be applied to various communication systems, such as a Global System of Mobile (GSM) communication system, a Code Division Multiple Access (CDMA) system, a Wideband Code Division Multiple Access (WCDMA) system, a General Packet Radio Service (GPRS) system, a Long Term Evolution (LTE) system, an Frequency Division Duplex (FDD) system, an Time Division Duplex (TDD) system, an Advanced long term evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Networks (WLAN), and a Wireless Fidelity (WiFi), next generation communication systems or other communication systems, and the like.

In general, conventional communication systems support a limited number of connections and are also easy to implement. However, with the development of communication technologies, mobile communication systems will not only support conventional communication, but will also support, such as Device to Device (D2D) communication, Machine to Machine (M2M) communication, Machine Type Communication (MTC) communication, and Vehicle to Vehicle (V2V) communication, etc., and embodiments of the present disclosure may also be applied to these communication systems.

Optionally, the communication system in the embodiments of the present disclosure may be applied to a Carrier Aggregation (CA) scenario, or may be applied to a Dual Connectivity (DC) scenario, or may be applied to a Standalone (SA) networking scenario.

Figure 1:
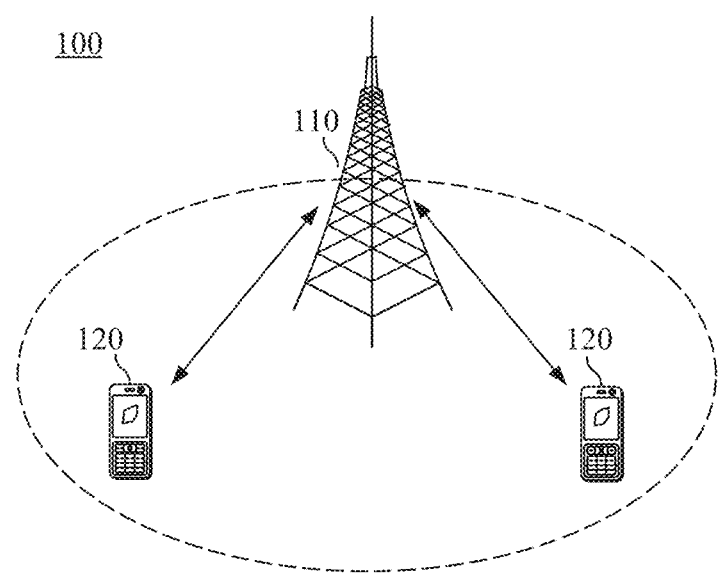
FIG. 1 is a schematic diagram of one possible wireless communication system to which an embodiment of the present disclosure applies.

Exemplarily, a communication system 100 to which an embodiment of the present disclosure applies is shown in FIG. 1. The wireless communication system 100 may include a network device 110. The network device 110 may be a device in communication with a terminal device. The network device 110 may provide communication coverage for a particular geographic area and may communicate with terminal devices located within the coverage area. optionally, the network device 100 may be a Base Transceiver Station (BTS) in a GSM system or a CDMA system, or may be a NodeB (NB) in a WCDMA system, or may be an Evolutional Node B (eNB or eNodeB) in an LTE system, or may be a network-side device in an NR system, or may be a wireless controller in a Cloud Radio Access Network (CRAN), or the network device may be a relay station, an access point, a vehicle-mounted device, a wearable device, a network-side device in a next-generation network, a network device in a future evolved Public Land Mobile Network (PLMN), or the like.

The wireless communication system 100 also includes at least one terminal device 120 located within coverage of the network device 110. The "terminal" used herein includes but is not limited to the connection via wired lines, such as via Public Switched Telephone Networks (PSTN), Digital Subscriber Line (DSL), digital cables, direct cable connections; and/or another data connection/network; and/or via a wireless interface, such as, for cellular networks, Wireless Local Area Network (WLAN), digital television networks such as DVB-H networks, satellite networks, AM-FM broadcast transmitters; and/or means of another terminal device arranged to receive/transmit communication signals; and/or Internet of Things (IOT) devices. A terminal device set to communicate via a wireless interface may be referred to as "a wireless communication terminal", "a wireless terminal" or "a mobile terminal".

The terminal device 120 may be mobile or stationary. Optionally, the terminal device 120 may refer to an access terminal, a User Equipment (UE), a subscriber unit, a subscriber station, a mobile station, a remote station, a remote terminal, a mobile device, a user terminal, a terminal, a wireless communication device, a user agent, or a user device. The access terminal may be a cellular telephone, a cordless telephone, a Session Initiation Protocol (SIP) telephone, a Wireless Local Loop (WLL) station, a Personal Digital Assistant (PDA), a handheld device having a wireless communication function, a computing device or other processing device connected to a wireless modem, an in-vehicle device, a wearable device, a terminal device in a future 5G network, a terminal device in a future evolved PLMN, or the like. Optionally, the terminals 120 may be perform communications on D2D direct connection.

Specifically, the network device 110 may provide a service for a cell, and the terminal device 120 communicates with the network device 110 through a transmission resource (such as a frequency domain resource, or a spectrum resource) used by the cell, the cell may be a cell corresponding to the network device 110 (such as a base station), the cell may belong to a Acer station, or may belong to a base station corresponding to a Small cell, the Small cells herein may include a Metro cell, a Micro cell, a Pico cell, a Femto cell, and the like, the Small cells have characteristics of small coverage and low transmission power, and are suitable for providing a high-rate data transmission service.

FIG. 1 illustrates one network device and two terminal devices. Optionally, the wireless communication system 100 may include multiple network devices and other numbers of terminal devices may be included within the coverage of each network device, which is not limited in the embodiments of the present disclosure. In addition, the wireless communication system 100 may include, for example, a network controller, a mobility management entity, and other network entities, which are not limited in the embodiments of the present disclosure.

On the unlicensed spectrum, the number of candidate SSB positions used to transmit SSBs within a Discovery Reference Signal (DRS) transmission window (hereinafter referred to simply as the DRS window) may be greater than the number of SSBs actually transmitted by the network device. That is, for each DRS window, the network device may determine which SSB positions are used to transmit SSBs according to the result of obtaining the right of use of the channel on the unlicensed spectrum within the DRS window (e.g., according to the result of LBT performed within the DRS window), and SSB positions actually used to transmit SSBs within different DRS windows may be different.

Optionally, the SSB includes a Primary Synchronization Signal (PSS) and a Secondary Synchronization Signal (SSS). Furthermore, optionally, the SSB further includes at least one of a Physical Broadcast Channel (PBCH), a set of control channel resources for scheduling Remaining Minimum System Information (RMSI), RMSI, a Channel Status Information Reference Signal (CSI-RS), Other System Information (OSI), or a paging message.

However, after the network device obtains the right of use of the channel, a duration for which downlink transmission can be performed cannot exceed a Maximum Channel Occupation Time (MCOT). Therefore, SSB transmissions within the DRS window may be truncated due to the MCOT. For example, the network device configures the number of SSBs transmitted on the unlicensed spectrum to be X, and within the previous TXOP, only K SSB positions can be used to transmit SSBs due to the limitation of MCOT, where K<X.

Figure 2:
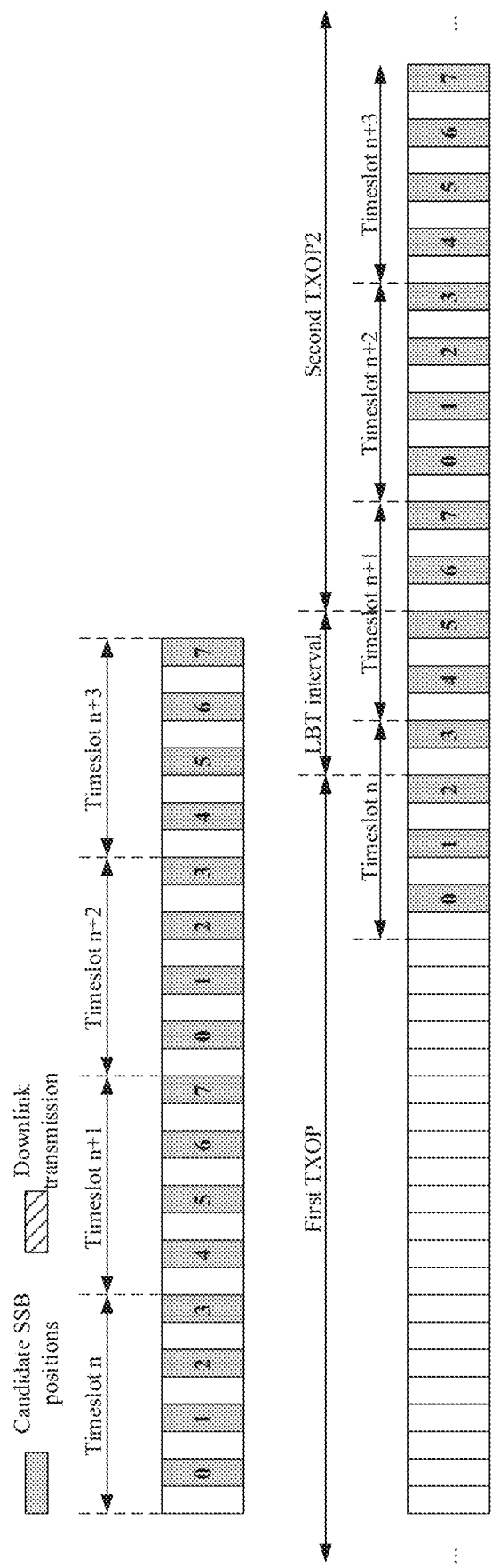
FIG. 2 is a schematic diagram of the number of SSB positions capable of being used to transmit SSBs within the TXOP being less than the number of SSBs to be transmitted.

For example, as shown in FIG. 2, the upper diagram in FIG. 2 shows candidate SSB positions within a DRS window, it is assumed that the number X of SSBs to be transmitted configured by the network device on the unlicensed spectrum is X=8, and the SSBs are respectively represented as SSB #0, SSB #1, SSB #2, SSB #3, SSB #4, SSB #5, SSB #6, and SSB #7. As shown in FIG. 2, the positions having numbers marked therein in the timeslot n, the timeslot n+1, the timeslot n+2 and the timeslot n+3 in the DRS window are candidate SSB positions, and the candidate SSB positions may be agreed upon in protocols or configured by the network device. The numbers represent serial numbers of the SSB positions, where each candidate SSB position is used to transmit the corresponding SSB, and for candidate SSB positions have a same serial number, it is indicated that the candidate SSB positions may be used to transmit SSBs with the same Quasi-Co-Location (QCL) relationship. For example, the SSB positions 0 in timeslot n and timeslot n+2 are used to transmit SSB #0, the SSB positions 1 in timeslot n and timeslot n+2 are used to transmit SSB #1, . . . and SSB positions 7 in timeslot n+1 and timeslot n+3 are used to transmit SSB #7, where each SSB is transmitted only at its corresponding SSB position. When the network device preempts the SSB position based on the LBT, the SSB corresponding to the SSB position may be transmitted at the SSB position. 16 candidate SSB positions are shown in the upper diagram in FIG. 2. In the actual transmission process, the SSB positions capable of being used to transmit SSBs may include only a part of the SSB positions, for example, the SSB positions in timeslot n and timeslot n+1, or, the SSB positions in timeslot n+2 and timeslot n+3. The specific SSB positions capable of being used to transmit SSBs need to be determined by factors such as LBT, The SSB positions that are actually used among the candidate SSB positions are referred to as the SSB positions capable of being used to transmit SSBs in the embodiments of the present disclosure.

However, as shown in the lower diagram in FIG. 2, when the network device obtains the first TXOP based on the LBT, the network device can transmit the SSBs only at a part of the SSB positions within the first TXOP due to the limitation of the MCOT. As shown in FIG. 2, only the SSB position 0, the SSB position 1 and the SSB position 2 in the timeslot n within the first TXOP can be used to transmit the corresponding SSB. Although there are candidate SSB positions in the timeslot n+1, the timeslot n+2 and the timeslot n+3, these candidate SSB positions can be used only after the network device gets the right of use of the channels at these positions.

Because of the uncertainty of obtaining the right of use of a channel on an unlicensed spectrum, an embodiment of the present disclosure provides a method for transmitting of an SSB on an unlicensed spectrum to implement efficient transmission of the SSB.

FIG. 3 is a schematic flow chart of a method 300 for transmitting an SSB on an unlicensed spectrum according to an embodiment of the present disclosure. The method described in FIG. 3 may be performed by a network device, such as the network device 110 shown in FIG. 1. As shown in FIG. 3, the method 300 for transmitting SSBs on the unlicensed spectrum may include some or all of the following operations.

In operation 310, the network device determines that a TXOP on an unlicensed carrier includes K SSB positions capable of being used to transmit SSBs.

Where K is less than a number X of SSBs configured by the network device for transmission on the unlicensed carrier, and K and X are both positive integers.

In operation 320, the network device transmits K SSBs of the X SSBs at the corresponding K SSB positions within the first TXOP In the embodiment, when the number K of SSB positions capable of being used to transmit SSBs within one TXOP on the unlicensed carriers is less than the number X of SSBs configured by the network device for transmission on the unlicensed carrier, that is, when the currently SSB positions capable of being used to transmit SSBs within the TXOP are insufficient to transmit the X SSBs, the network device may transmit K SSBs of the X SSBs at the corresponding K SSB positions within the TXOP, so that the terminal device can receive at least all or part of the K SSBs.

For example, it is assumed that the number X of SSBs to be transmitted configured by the network device on the unlicensed spectrum is X=8, and the SSBs are respectively represented as SSB #0, SSB #1, SSB #2, SSB #3, SSB #4, SSB #5, SSB #6, and SSB #7. Taking FIG. 2 as an example, the number K of candidate SSB positions capable of being used to transmit SSBs within the first TXOP are only K=3, and the candidate SSB positions are SSB position 0, SSB position 1 and SSB position 2 in the timeslot n. Then, the network device may transmit, within the first TXOP, the SSB #0 at the SSB position 0 in the timeslot n, transmit the SSB #1 at the SSB position 1 in the timeslot n, and transmit the SSB #2 at the SSB position 2 in the timeslot n.

Then, there are remaining X-K SSBs of the X SSBs left which are not transmitted. Then, optionally, after operation 320, the method may further include operation 330.

In operation 330, the network device transmits the remaining X-K SSBs of the X SSBs within a second TXOP after the first TXOP. Each of the X SSBs is transmitted at a candidate SSB position corresponding to the SSB, and different SSBs correspond to different candidate SSB positions.

That is to say, the network device transmits K SSBs at K SSB positions capable of being used to transmit SSBs within the first TXOP, and transmits the remaining X-K SSBs within the second TXOP after the first TXOP.

It should be noted that the SSB transmitted at each candidate SSB position is not an arbitrary SSB, but an SSB corresponding to the SSB position. There is a correspondence relationship between the candidate SSB position and the SSB index, or there is a QCL relationship between different SSB positions. For example, as shown in FIG. 2, SSB position 0 corresponds to SSB #0, and therefore the SSB positions 0 in timeslot n and timeslot n+2 are used to transmit SSB #0, or there is an QCL relationship between the SSB transmitted at SSB position 0 in timeslot n and the SSB transmitted at SSB position 0 in timeslot n+2; SSB position 1 corresponds to SSB #1, and therefore the SSB positions 1 in timeslot n and timeslot n+2 are used to transmit SSB #1, or there is an QCL relationship between the SSB transmitted at SSB position 1 in timeslot n and the SSB transmitted at SSB position 1 in timeslot n+2; similarly, SSB position 7 corresponds to SSB #7, and therefore the SSB positions 7 in timeslot n+1 and timeslot n+3 are used to transmit SSB #7, or there is an QCL relationship between the SSB transmitted at SSB position 7 in timeslot n1 and the SSB transmitted at SSB position 7 in timeslot n+3. Such a correspondence relationship may be agreed upon in protocols or configured by the network device. When the network device transmits the remaining X-K SSBs within a second TXOP After acquiring the second TXOP after the first TXOP, each SSB of the X-K SSBs can only be transmitted at its corresponding SSB position.

In this way, when the number K of SSB positions capable of being used to transmit SSBs within the first TXOP on the unlicensed carrier is less than the number X of SSBs configured by the network device for transmission on the unlicensed carrier, that is, the currently SSB positions capable of being used to transmit SSBs within the first TXOP are insufficient to completely transmit the X SSBs, the network device may jointly perform efficient transmission of the SSBs through the first TXOP and the second TXOP following the first TXOP. The second TXOP and the first TXOP may be located in the same DRS window or may be located in different DRS windows.

How the network device transmits the remaining X-K SSBs at corresponding SSB positions within the second TXOP is described in detail below in conjunction with FIG. 4 to FIG. 6. Embodiments of the present disclosure provide two manners to enable the network device to perform efficient transmission of SSBs within the second TXOP. It is assumed that the number of SSB positions capable of being used to transmit SSBs within the second TXOP is greater than X-K.

Manner 1

Optionally, in operation 330, the network device transmits the K SSBs within the first TXOP, and transmits the remaining X-K SSBs from a (K+1)-th SSB within the second TXOP until the (K+1)-th SSB to an K-th SSB are sequentially transmitted.

Figure 4:
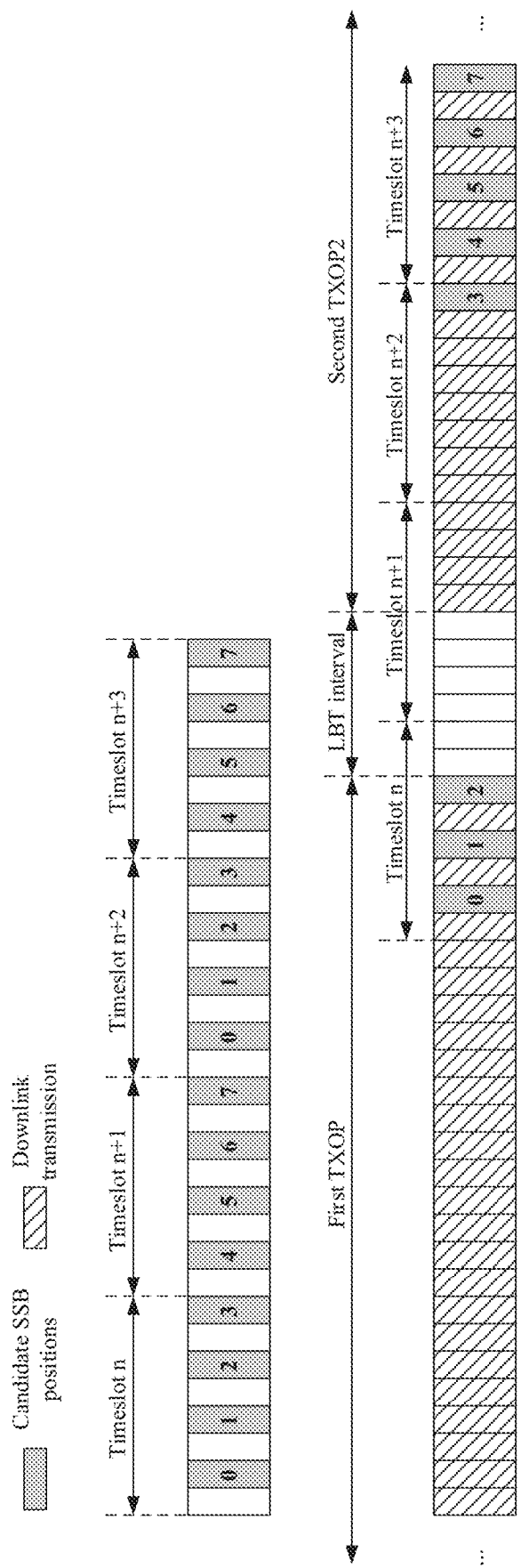
FIG. 4 is a schematic diagram of transmission of SSBs within different TXOP according to an embodiment of the present disclosure.

Taking FIG. 4 as an example, it is assumed that the number X of SSBs to be transmitted configured by the network device on the unlicensed spectrum is X=8, and the SSBs are respectively represented as SSB #0, SSB #1, SSB #2, SSB #3, SSB #4, SSB #5, SSB #6, and SSB #7. As shown in FIG. 4, the network device transmits SSB #0 at SSB position 0 within the first TXOP, transmits SSB #1 at SSB position 1 within the first TXOP, and transmits SSB #2 at SSB position 2 within the first TXOP. Due to the influence of the MCOT, the end position of the first TXOP is at the time when the transmission of the SSB #2 ends, so that the network device needs to proceed with the LBT after the end of the first TXOP. It is assumed that the network device completes LBT channel detection in timeslot n+1, or in other words, the network device obtains the right of use of the channel in timeslot n+1, then the network device may perform transmission of the SSBs within the second TXOP. Within the second TXOP, the network device transmits the remaining X-K SSBs from the (K+1)-th SSB, that is, the SSB #3. Since the SSB position corresponding to the SSB #3 is the SSB position 3, the network device sequentially transmits SSB #3, SSB #4, SSB #5, SSB #6, and SSB #7 at the SSB position 3, the SSB position 4, the SSB position 5, the SSB position 6 and the SSB position 7 within the second TXOP Manner 2

Optionally, at operation 330, the network device transmits an SSB from a first SSB position capable of being used to transmit SSB within the second TXOP until the remaining X-K SSBs are transmitted.

Compared with manner 1, in manner 2, the network device transmits the corresponding SSB from the first position usable to transmit an SSB, and in manner 1, the network device transmits the SSB from the first SSB of the remaining X-K SSBs at the corresponding SSB position.

It should be understood that in the embodiment of the present disclosure, the first SSB position capable of being used to transmit SSB may be a first SSB position after the LBT succeeds, or may be the first SSB position after a preconfigured specific SSB position after the LBT succeeds. For example, the preconfigured positions capable of starting SSB transmission are SSB position 0, SSB position 2, SSB position 4 and SSB position 6, and the network device succeeds in LBT before SSB position 1, then, the network device starts transmission of SSBs from the SSB position 2, at this time, SSB position 1 can be used for other data transmission.

Figure 5:
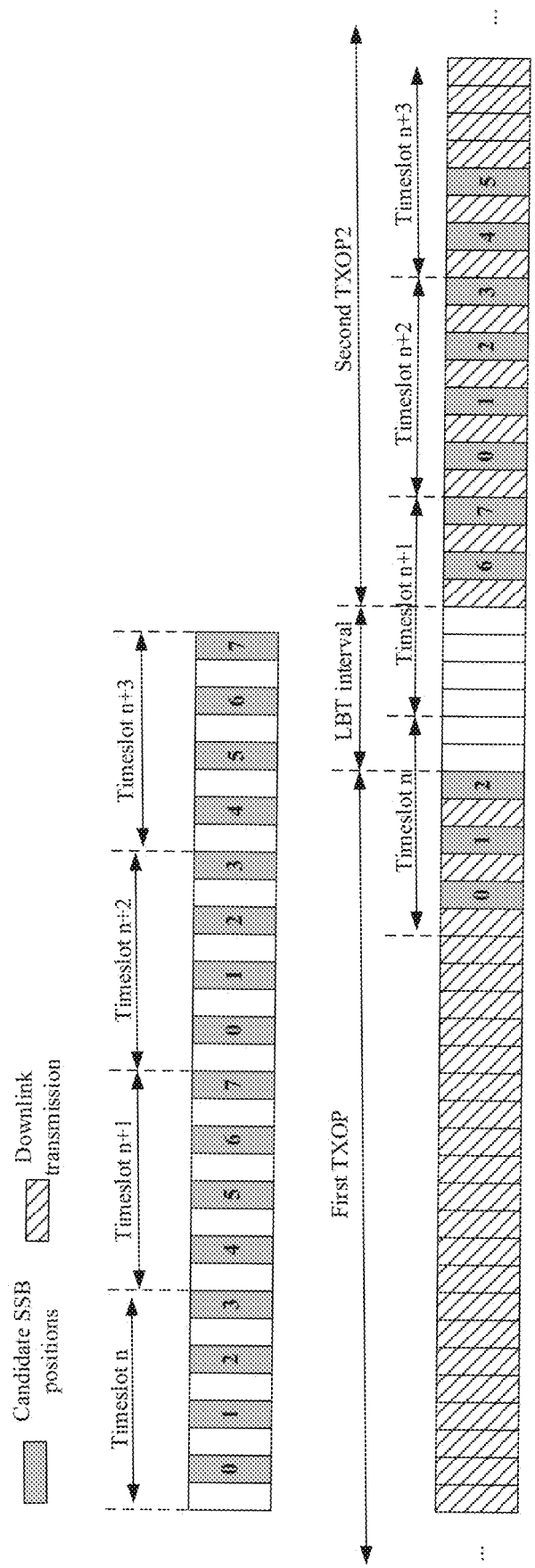
FIG. 5 is a schematic diagram of transmission of SSBs within different TXOP according to an embodiment of the present disclosure.

Taking FIG. 5 as an example, it is still assumed that the number X of SSBs to be transmitted configured by the network device on the unlicensed spectrum is X=8, and the SSBs are respectively represented as SSB #0, SSB #1, SSB #2, SSB #3, SSB #4, SSB #5, SSB #6, and SSB #7. As shown in FIG. 5, the network device transmits SSB #0 at SSB position 0 within the first TXOP, transmits SSB #1 at SSB position 1 within the first TXOP, and transmits SSB #2 at SSB position 2 within the first TXOP. Thereafter, the network device obtains the second TXOP through the LBT. As can be seen, the first position capable of being used to transmit the SSB within the second TXOP is SSB position 6, SSB position 6 is one of the candidate SSB positions, and SSB position 6 is idle. Within the second TXOP, the network device transmits the SSBs from the SSB position 6. Since the SSB position 6 is used to transmit the corresponding SSB #6, the network device sequentially transmits the SSB #6, SSB #7, SSB #0, SSB #1, SSB #2, SSB #3, SSB #4, and SSB #5 at the SSB position 6, the SSB position 7, the SSB position 0, the SSB position 1, the SSB position 2, the SSB position 3, the SSB position 4 and the SSB position 5, respectively, within the second TXOP. Thus far, each of the X SSBs is transmitted.

As can be seen from FIG. 5, at SSB position 0, SSB position 1 and SSB position 2 within the first TXOP, the network device respectively transmits SSB #0, SSB #1 and SSB #2 once; and at SSB position 0, SSB position 1 and SSB position 2 within the second TXOP, the network device repeatedly transmits SSB #0, SSB #1 and SSB #2. That is, at K SSB positions within the second TXOP corresponding to the K SSBs, the network device repeatedly transmits the K SSBs, respectively.

Of course, the network device may not perform repeated transmission of the SSBs. That is, at K SSB positions within the second TXOP corresponding to the K SSBs, the network device does not transmit the K SSBs anymore.

Figure 6:
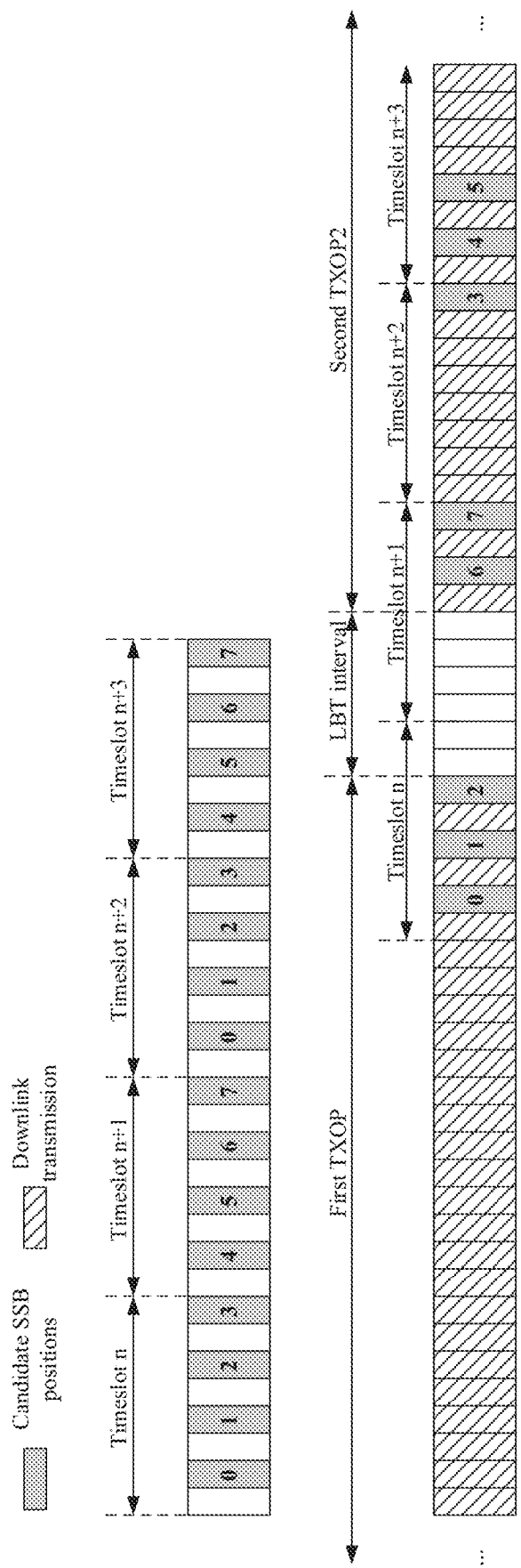
FIG. 6 is a schematic diagram of transmission of SSBs within different TXOP according to an embodiment of the present disclosure.

Taking FIG. 6 as an example, the first position capable of being used to transmit the SSB is the SSB position 6 within the second TXOP, and the SSB position 6 is a candidate SSB position and is idle. Within the second TXOP, the network device transmits the SSB from SSB position 6. However, since SSB #0, SSB #1 and SSB #2 have been transmitted within the first TXOP, the network device will no longer transmit SSB #0, SSB #1 and SSB #2 within the second TXOP. Therefore, the network device sequentially transmits SSB #6, SSB #7, SSB #3, SSB #4 and SSB #5 at the SSB position 6, the SSB position 7, the SSB position 3, the SSB position 4 and the SSB position 5, respectively, within the second TXOP.

It should be understood that in the embodiment of the present disclosure, the positions that are not selected by the network device for transmitting can be used to perform normal data transmission, such as transmission of downlink data, to improve resource utilization.

FIG. 7 is a schematic flow chart of a method 700 for transmitting an SSB on an unlicensed spectrum according to another embodiment of the present disclosure. The method described in FIG. 7 may be performed by a network device, such as the network device 110 shown in FIG. 1. As shown in FIG. 7, the method 700 for transmitting the SSB on the unlicensed spectrum may include some or all of the following operations.

In operation 710, the network device determines that a first TXOP on an unlicensed carrier includes K SSB positions capable of being used to transmit SSBs.

Where K is less than a number X of SSBs configured by the network device for transmission on the unlicensed carrier, and K and X are both positive integers.

In operation 720, the network device determines that the K SSB positions capable of being used to transmit SSBs within the first TXOP are not used to transmit SSBs.

In the embodiment, when the number K of SSB positions capable of being used to transmit SSBs within one TXOP on the unlicensed carrier is less than the number X of SSBs configured by the network device for transmission on the unlicensed carrier, that is, when the currently SSB positions capable of being used to transmit SSBs within the TXOP are insufficient to transmit the X SSBs, the network device may not transmit SSBs at the K SSB positions within the TXOP, so as to ensure continuity of transmission of the X SSBs and reduce complexity of signal processing. Furthermore, the K SSB positions may be used for other data transmission to improve resource utilization.

Optionally, after operation 720, the method may further include operation 730.

In operation 730, the network device transmits the X SSBs within a second TXOP after the first TXOP Each of the X SSBs is transmitted at a candidate SSB position corresponding to the SSB, and different SSBs correspond to different candidate SSB positions.

It should be noted that the SSB transmitted at each candidate SSB position is not an arbitrary SSB, but an SSB corresponding to the SSB position. There is a correspondence relationship between the candidate SSB position and the SSB index, or there is a QCL relationship between different SSB positions. For example, as shown in FIG. 2, SSB position 0 corresponds to SSB #0, and therefore the SSB positions 0 in timeslot n and timeslot n+2 are used to transmit SSB #0, or there is a QCL relationship between the SSB transmitted at SSB position 0 in timeslot n and the SSB transmitted at SSB position 0 in timeslot n+2; SSB position 1 corresponds to SSB #1, and therefore the SSB positions 1 in timeslot n and timeslot n+2 are used to transmit SSB #1, or there is a QCL relationship between the SSB transmitted at SSB position 1 in timeslot n and the SSB transmitted at SSB position 1 in timeslot n+2; similarly, SSB position 7 corresponds to SSB #7, and therefore the SSB positions 7 in timeslot n+1 and timeslot n+3 are used to transmit SSB #7, or there is a QCL relationship between the SSB transmitted at SSB position 7 in timeslot n1 and the SSB transmitted at SSB position 7 in timeslot n+3. Such a correspondence relationship may be agreed upon in protocols or configured by the network device. When the network device transmits the X SSBs within a second TXOP after acquiring the second TXOP after the first TXOP, each of the X SSBs can only be transmitted at its corresponding SSB position.

Furthermore, optionally, the operation 730 that the network device transmits the X SSBs within the second TXOP after the first TXOP includes: the network device transmits an SSB from a first SSB position capable of being used to transmit SSB within the second TXOP until the X SSBs are transmitted.

Figure 8:
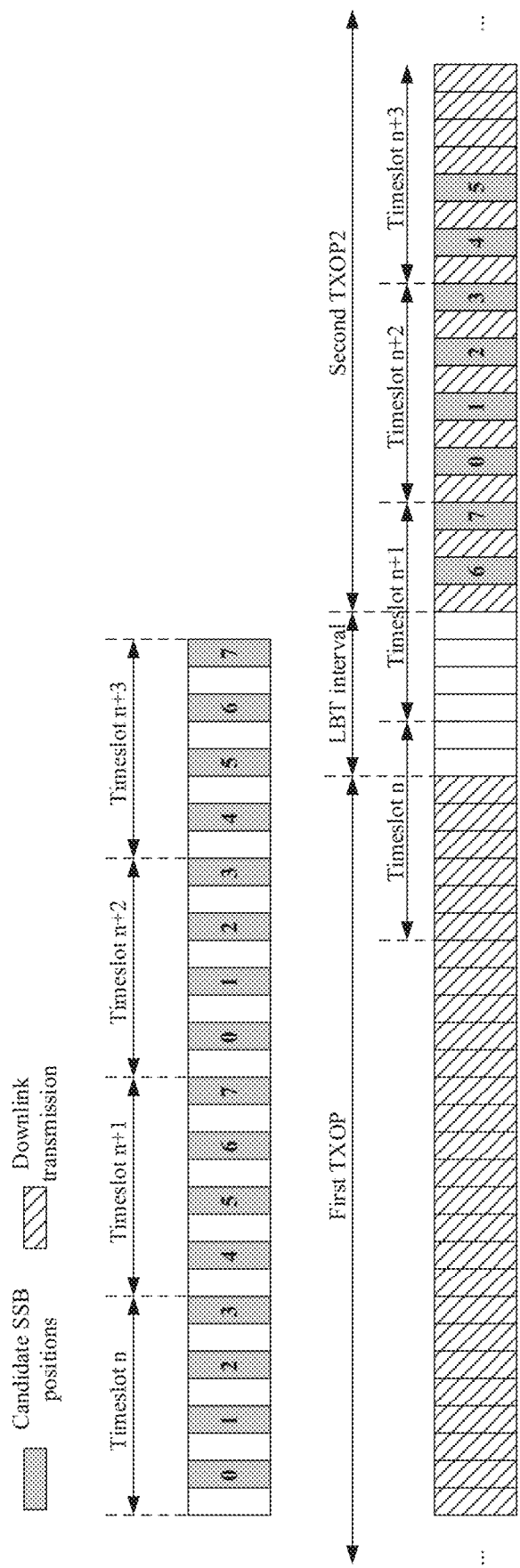
FIG. 8 is a schematic diagram of transmission of SSBs within a second TXOP according to an embodiment of the present disclosure.

For example, as shown in FIG. 8, it is assumed that the number X of SSBs to be transmitted configured by the network device on the unlicensed spectrum is X=8, and the SSBs are respectively represented as SSB #0, SSB #1, SSB #2, SSB #3, SSB #4, SSB #5, SSB #6, and SSB #7. As shown in FIG. 8, the SSB positions capable of being used to transmit the SSBs within the first TXOP only include the SSB position 0, the SSB position 1 and the SSB position 2 in the timeslot n. Since K=3 is less than X=8, the network device does not transmit the SSBs within the first TXOP. The network device proceeds with the LBT after the end of the first TXOP, and starts transmission within the second TXOP after obtaining the right of use of the channel. Within the second TXOP, the network device transmits the SSB from the first SSB position capable of being used to transmit SSB until the X SSBs are transmitted. As can be seen, the first position capable of being used to transmit the SSB within the second TXOP is SSB position 6, SSB position 6 is one of the candidate SSB positions, and SSB position 6 is idle. Within the second TXOP, the network device starts to transmit the SSBs from the SSB position 6. Since the SSB position 6 is used to transmit the corresponding SSB #6, the network device sequentially transmits the SSB #6, SSB #7, SSB #0, SSB #1, SSB #2, SSB #3, SSB #4, and SSB #5 at the SSB position 6, the SSB position 7, the SSB position 0, the SSB position 1, the SSB position 2, the SSB position 3, the SSB position 4, and the SSB position 5, respectively, within the second TXOP, so that the X SSBs are effectively transmitted.

According to the above technical solution, when the number K of SSB positions capable of being used to transmit SSBs within one TXOP on an unlicensed carrier is less than the number X of SSBs configured by the network device for transmission on the unlicensed carrier, that is, when the currently available SSB positions within the TXOP are insufficient to transmit the X SSBs, the network device may not transmit the SSBs within the first TXOP, but may transmit the X SSBs from the first SSB position capable of being used to transmit SSB within the second TXOP obtained thereafter, thereby ensuring continuous transmission of the SSBs.

It should be noted that the technical features in each embodiment and/or each feature of the embodiments described in the present disclosure may be combined arbitrarily with each other without conflict, and the technical solutions obtained after the combination shall also fall within the protection scope of the present disclosure. For example, if after the end of the first TXOP, there is no TXOP in the DRX window in which the first TXOP is located, or the is a TXOP in the DRX window but the number of SSB positions capable of being used to transmit SSB within each TXOP is less than X-K, then the network device may transmit SSBs at K SSB positions within the first TXOP; and if after the end of the first TXOP, there is a second TXOP in the DRX window in which the first TXOP is located and the number of SSB positions capable of being used to transmit SSBs within the second TXOP is greater than or equal to X, then the network device does not transmit SSBs at the K SSB positions within the first TXOP.

It is to be understood that, in the various embodiments of the present disclosure, the magnitude of the sequence numbers of the processes described above is not mean the order of execution, and the order of execution of the processes should be determined by their function and intrinsic logic, and should not be construed as any limitation on the implementation of the embodiments of the present disclosure.

A communication method according to an embodiment of the present disclosure is described in detail above, and a device according to an embodiment of the present disclosure will be described below in combination with FIGS. 8 to 16. The technical features described in the method embodiments are applicable to the following device embodiments.

Figure 9:
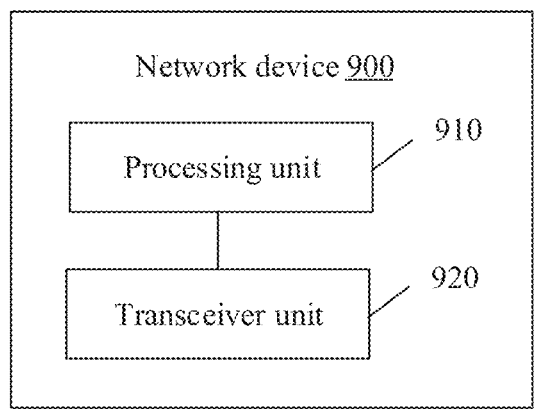
FIG. 9 is a schematic block diagram of a network device according to an embodiment of the present disclosure.

FIG. 9 is a schematic block diagram of a network device 900 according to an embodiment of the present disclosure. As shown in FIG. 9, the network device 900 includes a processing unit 910 and a transceiver unit 920.

A processing unit 910, configured to determine that a first TXOP on an unlicensed carrier includes K SSB positions capable of being used to transmit SSBs, where K is less than the number X of SSBs configured by the network device for transmission on the unlicensed carrier, and K and X are both positive integers;

A transceiver unit 920, configured to respectively transmit K SSBs of the X SSBs at the corresponding K SSB positions within the first TXOP.

Therefore, when the number K of SSB positions capable of being used to transmit SSBs within one TXOP on the unlicensed carrier is less than the number X of SSBs configured by the network device for transmission on the unlicensed carrier, that is, when the currently SSB positions capable of being used to transmit SSBs within the TXOP are insufficient to transmit the X SSBs, the network device may transmit the K SSBs of the X SSBs at the corresponding K SSB positions within the TXOP, so that the terminal device can receive at least the K SSBs first to perform rate matching.

Optionally, the transceiver unit 920 is further configured to transmit remaining X-K SSBs of the X SSBs within a second TXOP after the first TXOP, each of the X SSBs is transmitted at a candidate SSB position corresponding to the SSB, and different SSBs correspond to different candidate SSB positions.

In this way, the remaining X-K SSBs of the X SSBs are transmitted within the second TXOP after the first TXOP, so that all the X SSBs can be efficiently transmitted.

Optionally, the transceiver unit 920 is specifically configured to transmit the remaining X-K SSBs from a (K+1)-th SSB within the second TXOP until the (K+1)-th SSB to an X-th SSB are sequentially transmitted.

Optionally, the transceiver unit 920 is specifically configured to transmit an SSB from a usable first SSB position within the second TXOP until the remaining X-K SSBs are transmitted.

Optionally, the network device repeatedly transmits the K SSBs respectively at the K SSB positions corresponding to the K SSBs within the second TXOP.

Optionally, the network device no longer transmits the K SSBs at K the SSB positions corresponding to the K SSBs within the second TXOP.

It should be understood that the network device 900 may perform the corresponding operations performed by the network device in the above-described method 300, and details are not described herein for brevity.

Figure 10:
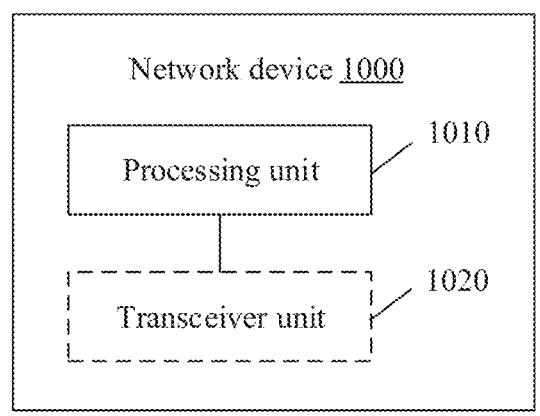
FIG. 10 is a schematic block diagram of a network device according to another embodiment of the present disclosure.

FIG. 10 is a schematic block diagram of a network device 1000 according to another embodiment of the present disclosure. As shown in FIG. 10, the network device 1000 includes a processing unit 1010.

The processing unit 1010 is configured to determine that a first TXOP on an unlicensed carrier includes K SSB positions capable of being used to transmit SSBs, where K is less than the number X of SSBs configured by the network device for transmission on the unlicensed carrier, and K and X are both positive integers.

The processing unit 1010 is further configured to determine that the K SSB positions capable of being used to transmit SSBs within the first TXOP are not used to transmit SSBs.

Therefore, when the number K of SSB positions capable of being used to transmit within one TXOP on the unlicensed carriers is less than the number X of SSBs configured by the network device for transmission on the unlicensed carriers, that is, when the currently SSB positions capable of being used to transmit SSBs within the TXOP are insufficient to transmit the X SSBs, in order to ensure continuous transmission of the X SSBs, the network device may not transmit the SSBs at the K SSB positions within the TXOP, and the K SSB positions may be used to transmit other data, thereby improving resource utilization.

Optionally, the network device further includes a transceiver unit 1020, configured to: transmit the X SSBs within a second TXOP after the first TXOP, wherein each of the X SSBs is transmitted at a candidate SSB position corresponding to the SSB, and different SSBs correspond to different candidate SSB positions.

Thus, by continuously transmitting the X SSBs within the second TXOP after the first TXOP, each of the X SSBs can all be efficiently transmitted.

Optionally, the transceiver unit 1020 is specifically configured to transmit an SSB from the first SSB position capable of being used to transmit SSB within the second TXOP until the X SSBs are transmitted.

It should be understood that the network device 1000 may perform the corresponding operations performed by the network device in the above-described method 700, and details are not described herein for brevity.

Figure 11:
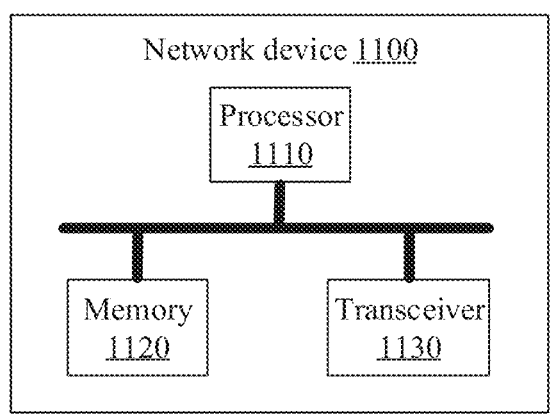
FIG. 11 is a schematic structure diagram of a network device according to an embodiment of the present disclosure.

FIG. 11 is a schematic structure diagram of a network device 1100 according to an embodiment of the present disclosure. The network device 1100 shown in FIG. 11 includes a processor 1110, the processor 1110 can invoke and run a computer program from a memory to implement the corresponding flow implemented by the network device in the various methods of the embodiments of the present disclosure, which is not described herein for brevity.

Optionally, as shown in FIG. 11, the network device 1100 may also include a memory 1120. The processor 1110 may invoke and run a computer program from the memory 1120 to implement the method in the embodiments of the present disclosure.

The memory 1120 may be a separate device independent of the processor 1110, or may be integrated in the processor 1110.

Optionally, as shown in FIG. 11, the network device 1100 may also include a transceiver 1130, and the transceiver 1130 may be controlled by the processor 1110 to communicate with other devices, specifically, may transmit information or data to other devices, or receive information or data from other devices.

The transceiver 1130 may include a transmitter and a receiver. The transceiver 1130 may further include an antenna, and the number of the antennas may be one or more.

Figure 12:
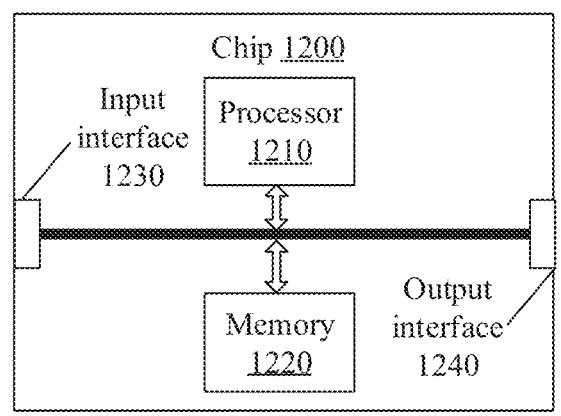
FIG. 12 is a schematic structure diagram of a chip according to an embodiment of the present disclosure.

FIG. 12 is a schematic structure diagram of a chip according to an embodiment of the present disclosure. The chip 1200 shown in FIG. 12 includes a processor 1210, and the processor 1210 can invoke and run a computer program from memory to implement the corresponding flow implemented by a network device in the various methods of the embodiments of the present disclosure, which is not described herein for brevity.

Optionally, as shown in FIG. 12, the chip 1200 may also include a memory 1220. The processor 1210 may invoke and run a computer program from the memory 1220 to implement the method in the embodiments of the present disclosure.

The memory 1220 may be a separate device independent of the processor 1210, or may be integrated in the processor 1210.

Optionally, the chip 1200 may also include an input interface 1230. The processor 1210 may control the input interface 1230 to communicate with other devices or chips, and specifically, may acquire information or data transmitted from other devices or chips.

Optionally, the chip 1200 may also include an output interface 1240. The processor 1210 may control the output interface 1240 to communicate with other devices or chips, and specifically, may output information or data to other devices or chips.

According to the above technical solutions, when the number K of SSB positions capable of being used to transmit SSBs within one TXOP on an unlicensed carrier is less than the number X of SSBs configured by the network device for transmission on the unlicensed carrier, that is, when the currently SSB positions capable of being used to transmit SSBs within the TXOP are insufficient to transmit the X SSBs, the network device can transmit K SSBs of the X SSBs at the corresponding K SSB positions within the TXOP, so that the terminal device can receive at least part of the X SSBs.

It should be understood that the chips mentioned in the embodiments of the present disclosure can also be referred to as system level chips, system chips, chip systems or on-chip system chips, etc.

It is to be understood that the processor of the embodiment of the present disclosure may be an integrated circuit chip with signal processing capability. In the implementation process, each step of the above method embodiment can be completed by the instruction in the form of integrated logic circuit of hardware or software in the processor. The above processors can be general purpose processors, digital signal processors (DSPS), application specific integrated circuits (ASICs), field programmable gate arrays (FPGAs) or other programmable logic devices, discrete gate or transistor logic devices, and discrete hardware components. The disclosed methods, steps and logic block diagrams in the embodiments of the present disclosure can be implemented or executed. The general-purpose processor may be a microprocessor or the processor may be any conventional processor or the like. The steps of the method disclosed in connection with the embodiment of the present disclosure can be directly embodied in the execution completion of the hardware decoding processor, or by the combination of the hardware and software modules in the decoding processor. The software module can be located in random memory, flash memory, read-only memory, programmable read-only memory or electrically erasable programmable memory, register and other mature storage media in the art. The storage medium is located in the memory, and the processor reads the information in the memory and completes the steps of the above method in combination with its hardware.

It is to be understood that the memory in the embodiments of the present disclosure may be volatile memory or nonvolatile memory, or may include both volatile and nonvolatile memory. The nonvolatile memory can be read-only memory (ROM), programmable ROM (PROM), erasable Prom (EPROM), electrically erasable EPROM (EEPROM) or flash memory. Volatile memory can be random access memory (RAM), which is used as an external cache. Many forms of RAM are available, such as static RAM (SRAM), dynamic RAM (DRAM), synchronous DRAM (SDRAM), double data rate SDRAM (DDR SDRAM, enhanced SDRAM (ESDRAM), synchlink DRAM (SLDRAM) and direct Rambus RAM (DR RAM). It is to be noted that the memory of the systems and methods described herein is intended to include, but is not limited to, these and any other suitable types of memory.

It is to be understood that the above described memory is exemplary but not restrictive. For example, the memory in the embodiment of the present disclosure can also be static RAM (SRAM), dynamic RAM (DRAM), synchronous dynamic random access memory (synchronous DRAM (SDRAM), double data rate SDRAM (DDR SDRAM), enhanced SDRAM (ESDRAM), synchronous link DRAM (SLDRAM), direct RAM (DR RAM), etc. That is to say, the memory in the embodiments of the present disclosure is intended to include, but not limited to, these and any other suitable types of memory.

The embodiments of the present disclosure also provide a computer-readable storage medium for storing computer programs. Optionally, the computer-readable storage medium can be applied to the network device in the embodiment of the present disclosure, and the computer program enables the computer to execute the corresponding processes implemented by the network device in the various methods of the embodiment of the present disclosure. For the sake of brevity, it will not be repeated here.

The embodiment of the present disclosure also provides a computer program product, including a computer program instruction. The computer program product can be applied to the network device in the embodiments of the present disclosure, and the computer program instruction enables the computer to execute the corresponding processes implemented by the network device in the various methods of the embodiment of the disclosure. For the sake of brevity, it will not be repeated here.

The embodiment of the present disclosure also provides a computer program. Optionally, the computer program can be applied to the network device in the embodiments of the present disclosure. When the computer program runs on the computer, the computer executes the corresponding process realized by the network device in each method of the embodiment of the disclosure. For the sake of brevity, it will not be described here.

It should be understood that the terms "system" and "network" are used interchangeably herein. The term "and/or," as used herein, is merely an association that describes an associated object, meaning that there may be three relationships, e.g., A and/or B, which may mean that A alone, both A and B, and B alone, are present. In addition, the character "/" generally indicates that the associated object is an "or".

It should be understood that "B corresponding to A" indicates that B is associated with A, and B can be determined from A. It should also be understood, however, that determining B from A does not mean determining B from A only, but may also determine B from A and/or other information.

Those of ordinary skill in the art may realize that the unit and algorithm steps of each example described in combination with the disclosed embodiments herein can be realized by the combination of electronic hardware, or computer software and electronic hardware. Whether these functions are performed in hardware or software depends on the specific application and design constraints of the technical solution. A professional technician may use different methods to implement the described functions for each specific application, but such implementation shall not be considered beyond the scope of the present disclosure.

Those skilled in the art can clearly understand that for the convenience and simplicity of the description, the specific working process of the system, device and unit described above can refer to the corresponding process in the embodiment of the method described above, and will not be described here.

In several embodiments provided by the present disclosure, it should be understood that the disclosed systems, devices and methods can be realized in other ways. For example, the embodiment of the device described above is only schematic. For example, the division of the unit is only a logical function division, and there can be another division method in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms.

The unit described as a separation part may or may not be physically separated, and the unit displayed as a unit may or may not be a physical unit, that is, it may be located in one place, or it may be distributed to multiple network units. Some or all of the units can be selected according to the actual needs to achieve the purpose of the embodiment.

In addition, each functional unit in each embodiment of the present disclosure may be integrated in one processing unit, each unit may exist physically alone, or two or more units may be integrated in one unit.

If the function is realized in the form of a software function unit and sold or used as an independent product, it can be stored in a computer readable storage medium. Based on such understanding, the technical solution of the present disclosure, in essence or in the form of a software product, which is stored in a storage medium, includes several instructions for making a computer device (which can be a personal computer, a server, a network device, etc.) to perform all or part of the steps of the method according to each embodiment of the present disclosure. The aforementioned storage media include: U disk, mobile hard disk, read-only memory (ROM), random access memory (RAM), disk or optical disk and other media that can store program code.

The above are only the specific embodiments of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claims.

The invention claimed is:

1. A method for transmitting a synchronization signal block (SSB) on an unlicensed spectrum, comprising:
determining, by a network device, that a first transmission opportunity (TXOP) on an unlicensed carrier includes K SSB positions capable of being used to transmit SSBs, where K is less than a number X of SSBs configured by the network device for transmission on the unlicensed carrier, and K and X are both positive integers; and
respectively transmitting, by the network device, K SSBs of the X SSBs at the corresponding K SSB positions within the first TXOP,
wherein the method further comprises:
transmitting, by the network device, remaining X-K SSBs of the X SSBs within a second TXOP after the first TXOP, wherein each of the X SSBs is transmitted at a candidate SSB position corresponding to the SSB, and different SSBs correspond to different candidate SSB positions, wherein a Listen Before Talk (LBT) interval is between the first TXOP and the second TXOP,
wherein transmitting, by the network device, the remaining X-K SSBs of the X SSBs within the second TXOP after the first TXOP comprises:
transmitting, by the network device, the remaining X-K SSBs from a (K+1)-th SSB within the second TXOP until the (K+1)-th SSB to an X-th SSB are sequentially transmitted,
wherein the network device no longer transmits the K SSBs already transmitted within the first TXOP at K SSB positions within the second TXOP that correspond to the K SSB positions within the first TXOP.

2. The method of claim 1, wherein the first TXOP and the second TXOP are within a same Discovery Reference Signal (DRS) window.

3. The method of claim 1, wherein the candidate SSB position corresponds to an SSB index.

4. A network device, comprising:
a memory storing processor-executable instructions;
a processor configured to execute the stored processor-executable instructions to determine that a first transmission opportunity (TXOP) on an unlicensed carrier includes K SSB positions capable of being used to transmit SSBs, where K is less than a number X of SSBs configured by the network device for transmission on the unlicensed carrier, and K and X are both positive integers; and
a transceiver configured to transmit K SSBs of the X SSBs at the corresponding K SSB positions within the first TXOP, wherein the transceiver is further configured to:
transmit remaining X-K SSBs of the X SSBs within a second TXOP after the first TXOP, wherein each of the X SSBs is transmitted at a candidate SSB position corresponding to the SSB, and different SSBs correspond to different candidate SSB positions, wherein a Listen Before Talk (LBT) interval is between the first TXOP and the second TXOP,
wherein the transceiver is specifically configured to:
transmit the remaining X-K SSBs from a (K+1)-th SSB within the second TXOP until the (K+1)-th SSB to an X-th SSB are sequentially transmitted,
wherein the network device no longer transmits the K SSBs already transmitted within the first TXOP at K SSB positions within the second TXOP that correspond to the K SSB positions within the first TXOP.

5. The network device of claim 4, wherein the first TXOP and the second TXOP are within a same Discovery Reference Signal (DRS) window.

6. The network device of claim 4, wherein the candidate SSB position corresponds to an SSB index.

* * * * *